United States Patent [19]
Sharpe

[11] Patent Number: 6,094,146
[45] Date of Patent: *Jul. 25, 2000

[54] METHOD OF, AND COMMUNICATION SYSTEM FOR, SENDING MESSAGES

[75] Inventor: Anthony K. Sharpe, Cambridge, United Kingdom

[73] Assignee: Advantra International N.V., Ieper, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 08/890,136

[22] Filed: Jul. 9, 1997

Related U.S. Application Data

[63] Continuation of application No. 08/416,915, filed as application No. PCT/IB94/00255, Apr. 20, 1995, abandoned.

[30] Foreign Application Priority Data

Aug. 27, 1993 [GB] United Kingdom ............... 9317884

[51] Int. Cl.[7] ............................................ H04Q 7/00
[52] U.S. Cl. ........................ 340/825.44; 340/825.47; 340/825.07; 455/38.1; 455/38.2; 455/39; 379/56.1
[58] Field of Search ................... 340/825.44, 825.47, 340/825.07; 379/56.1, 90.01; 455/38.1, 38.2, 39

[56] References Cited

U.S. PATENT DOCUMENTS

| 4,845,491 | 7/1989 | Fascenda et al. | 340/825.44 |
| 5,138,311 | 8/1992 | Weinberg | 340/825.03 |
| 5,398,021 | 3/1995 | Moore | 340/825.27 |

FOREIGN PATENT DOCUMENTS 2225140  5/1990  United Kingdom .

OTHER PUBLICATIONS

The Book of the CCIR Radiopaging Code No. 1, 1986, Appendix 1, pp. 38–40.

*Primary Examiner*—Jacques H. Louis-Jacques
*Assistant Examiner*—Yonel Beaulieu
*Attorney, Agent, or Firm*—Jack D. Slobod

[57] ABSTRACT

A method of transmitting messages in a communication system including a primary station and at least one secondary station, the secondary station being identifiable by an address code word, the primary station transmitting messages signals in the format of the address code word of an addressed secondary station concatenated with a plurality of message code words, wherein the primary station indicates the provision of an optional facility which it can provide to a secondary station by transmitting indicia representative of the facility in a field contained in at least one of the message code words concatenated with the secondary station's address code word.

13 Claims, 2 Drawing Sheets

METHOD OF, AND COMMUNICATION SYSTEM FOR, SENDING MESSAGES

This is a continuation of application Ser. No. 08/416,915, filed Apr. 20, 1995, now abandoned which is a 371 of PCT/IB94/00255..

TECHNICAL FIELD

The present invention relates to a method of, and communication system for, sending messages, for example paging messages.

BACKGROUND ART

For convenience of description the present invention will be described with reference to a high speed paging system which has been evolved from, and is compatible with, POCSAG or CCIR Radiopaging Code No 1, the details of which are disclosed in "The Book of the CCIR Radiopaging Code No 1" available from the Secretary, RCSG, British Telecom, Radiopaging, 23 Howland Street, London W1P 6HQ. In accordance with POCSAG, paging messages are transmitted in batches each of which comprises a synchronisation code word and 8 frames each comprising 2 code words. Each pager or secondary station is assigned to a particular frame which means that if a paging signal is transmitted by a primary station for a particular pager, it will be in a predetermined one of the 8 frames. Each POCSAG pager is controlled to power up to detect the synchronisation (sync) code word and again for the duration of its particular frame in order to be able to receive paging messages which are or commence with an address code word. In the case of messages, the message code words are concatenated with the address code word. The POCSAG address and message code words each comprise 32 bits of which the first bit has a value "0" for an address code word and "1" for a message code word. Both types of code words at bit positions 22 to 31 comprise cyclic redundancy check (CRC) bits and the bit position 32 provides an even parity bit. At the end of a message any waiting address code words will be transmitted, starting with the first appropriate to the first free frame. In the absence of an appropriate address code word, an idle code word, which is a non-allocated address code word is transmitted.

The high speed paging system which has evolved from POCSAG has a format comprising batches constructed with code words in frames following a synchronisation code word. In the high speed system operating at, say, 6400 bits per second, the number of code words in a batch is increased compared to the number, 17, in a batch when operating at 1200 bits per second. In order to ensure compatibility a fixed cycle period of 6.8 seconds is maintained for all formats. Depending on whether messages are numeric or alphanumeric only will depend on the number of batches, for example 3 or 15, there are to a cycle.

Additionally the high speed paging system requires the synchronisation code word to be a 32 bit, 1200 bit per second code word conforming to the same structure as that used for POCSAG. However, unlike normal POCSAG the synchronisation code word defines for the pager or secondary station the information type, frame format, code word structure and bit rate in its batch. Whilst the use of different synchronisation code words will enable a pager to adapt its receiver and decoder to receive and decode different signal formats, it is desired for a pager network to be able to offer various services and features to the pager user, if necessary by offering different services and features to the different pager users.

DISCLOSURE OF THE INVENTION

According to a first aspect of the present invention there is provided a method by which a primary station can signal the provision of additional optional facilities to a secondary station in a communication system, comprising the primary station transmitting an address code word which is concatenated with a field comprising indicia indicative of a facility being provided by the system, which indicia precedes the transmission of message code words.

According to a second aspect of the present invention there is provided a communication system comprising a primary station and at least one secondary station, the primary station having means for formatting and encoding message data into message code words, means for appending an address code word of a secondary station to the message code words, means for providing indicia indicative of a facility being provided by the system in a field subsequent to the address code word but preceding the message code words and transmitting means for transmitting the concatenated address code word, indicia and message code words, and the at least one secondary station having means for determining if the address code word in a message received by said receiving means is one assigned to the secondary station, means responsive to determining that the address code word is one assigned to the secondary station for decoding said indicia and message code words, means for adapting the secondary station in response to the indicia and means for storing the decoded message data.

According to a third aspect of the present invention there is provided a primary station for use in the communication system in accordance with the present invention, the primary station having means for formatting and encoding message data into message code words, means for appending an address code word of a secondary station to the formatted message, means for providing indicia indicative of a facility being provided by the system in a field subsequent to the address code word but preceding the message code words and transmitting means for transmitting the concatenated address code word, indicia and message code words.

According to a fourth aspect of the present invention there is provided a secondary station for use in the communication system in accordance with the present invention, the secondary station have means for receiving transmissions, means for determining if the address code word in a message received by said receiving means is one assigned to the secondary station, means responsive to determining that the address code word is one assigned to the secondary station for decoding said indicia and message code words, means for adapting the secondary station in response to the indicia and means for storing the decoded message data.

BRIEF DESCRIPTION OF DRAWINGS

The present invention will now be described, by way of example, with reference to the accompanying drawings, wherein.

MODES FOR CARRYING OUT THE INVENTION

Figure 1:
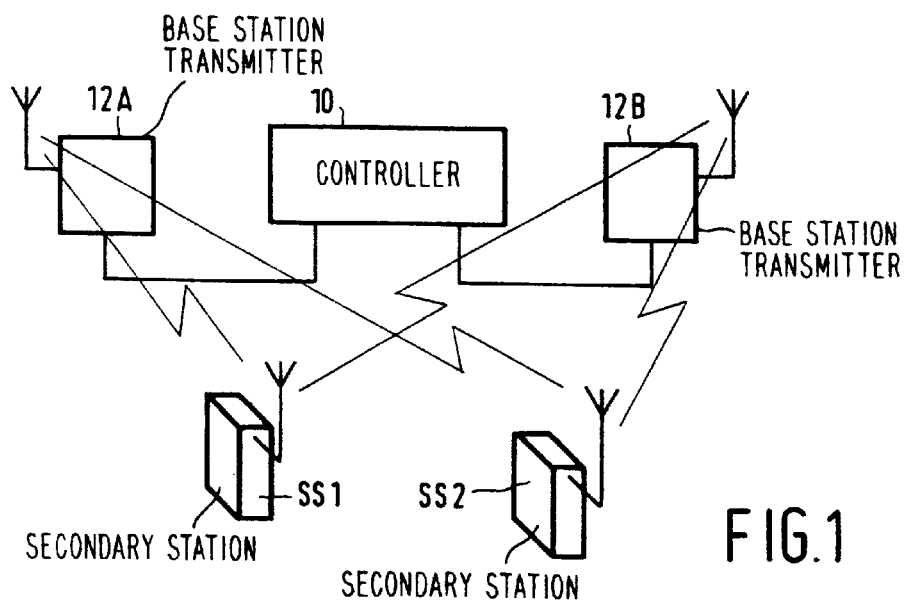
FIG. 1 is a diagram illustrating a paging system.

The paging system shown in FIG. 1 comprises a paging controller 10 which receives paging requests and formats the addresses and messages in accordance with the protocol being used. The paging controller 10 is connected to a plurality of base station transmitters 12A,12B which are operated in a quasi-synchronous mode. A plurality of digital pagers or secondary stations SS1,SS2 are free to roam within the coverage area of the base station transmitters 12A,12B. The operation of, and battery economising features of, the pagers SS1,SS2 correspond to that determined by the protocol being followed.

Figure 2:
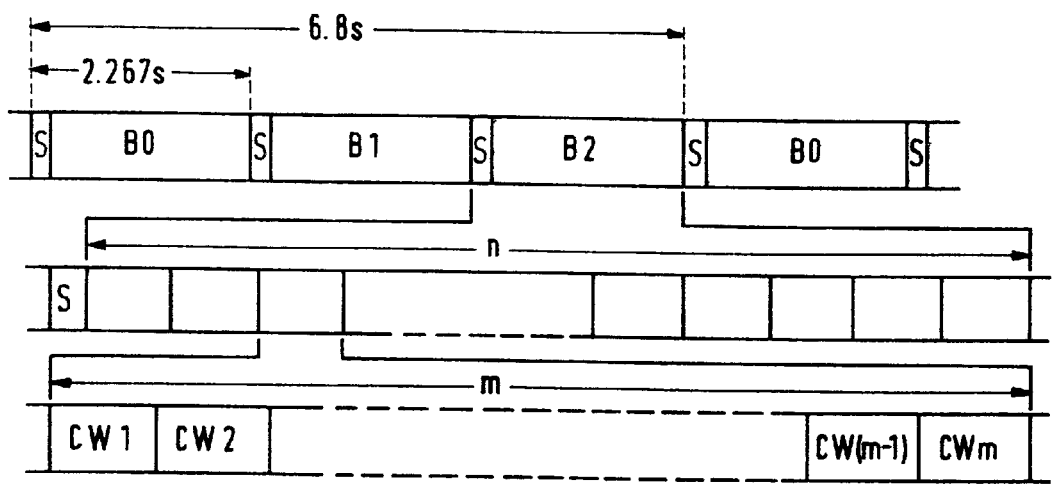
FIG. 2 is a diagram illustrating one example of a paging protocol.

In the example shown in FIG. 2, the paging protocol is a high speed protocol comprising successive cycles having a duration of 6.8 seconds. Each cycle comprises three batches B0,B1,B2 each having a duration of 2.267 seconds and each comprises a 32 bit synchronisation code word S transmitted at 1200 bits per second and n frames each comprising m code words (CW) transmitted at a data rate of 6400 bits per second. At such a data rate n=28, m=16 and each code word is 32 bits long and has the format of a POCSAG code word.

Figure 3A:
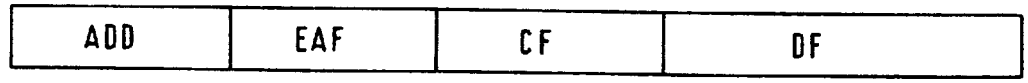
FIG. 3a illustrates one form of an extended address field (EAF) transmission structure.

Referring to FIG. 3a each message commences with a 32 bit address code word ADD which is concatenated with an extended address field EAF, a control field CF and a data field DF comprising a plurality of message code words M. As is customary with POCSAG, the first bit of an address code word has a value "0" and that of a message code word has a value "1".

Figure 3B:
FIG. 3b illustrates another form of the EAF transmission structure.

In FIG. 3b there is no control field and the data field is concatenated with the extended address field.

The facilities which can be provided by the network operator to a pager user can be divided into those programmed in the pager to be always associated with a specified Receiver Identity Code RIC or address and those independent of specified RICs or addresses. Facilities which are RIC or address dependent include call sequence numbering, subscription service identifier (SSI), batch zero message, and closed user groups.

For those pagers programmed for call sequence numbering the first two decimal digits following a specified address code word of a message will always indicate the sequence order of the message transmitted. The number transmitted is N+1 (module 100) where N is the sequence number of the previous message transmitted. Call sequence numbering can be programmed for personal or subscription service messages. Optionally, a pager may be designed to show this number or only indicate it to the user when a message is lost.

The subscription service identifier (SSI) enables an operator to offer more than 80 information services to pager users on a single common RIC or the network common batch zero marker, to be described.

A subscription service address code, or a Batch Zero Marker with function codes set to (0) for high speed paging or (00) for paging messages at 1200 bits per second will always be followed by a 7 bit subscription service identifier. A Batch Zero Marker is a non-allocated address code word inserted after the first synchronisation code word in the first batch of a cycle. This SSI identifies to which service the associated message is ascribed. Pagers enabled to receive such a service will decode a message according to the prevailing paging standards.

If call sequence numbering is enabled on these services the sequence number will follow the subscription service identifier. It is expected that, except for time messages, most subscription services will be provided in an alpha service. 4 bit numeric SSIs will have values in the range decimal 0 to 8, and 7 bit SSIs will have values in the range decimal 38 to 127.

A batch zero message is a subscription service message that can be received by all pagers on the network without an additional reduction of battery life. Subscription services provided on any other RICs will often require pagers to decode more than one frame per batch or more than one frame per cycle.

At least one subscription free identifier will be enabled in each pager so that information can be given to all users on the network when necessary. A subscription service identifier (SSI) applies to all the batch zero messages.

Flexible grouping of pagers may be achieved by using Extended Addresses. These Extended Addresses are identified by enabled pagers as the first two digits of the message following the address code word. These Extended Address identities must be included by the caller in the transmitted message as the first two digits entered. The call can call individuals or sub-groups conveniently as follows:

00=all call x0=sub-group where x=1 to 9

0y=sub-group where y=1 to 9 xy=individual call

Call sequence numbering cannot be used by such pagers. In paging networks where alpha-numeric message compression is an option, such message compression cannot be used in message addressed to closed user groups.

Turning now to facilities which are independent of RIC, these features require an Extended Address Field (EAF) to begin with a specified command character and be followed by a number of characters as defined in the following table which indicates commands for facilities available to a user. If a call sequence number is enabled on these RICs it will terminate the EAF.

| COMMANDS | | Character A (MSC) | Character B (LSC) |
|---|---|---|---|
| Urgent Message | Num | 1010 | 0001 |
| | Alpha | 1011110 | 1010101 |
| Voice Message | Num | 1010 | 0010 |
| | Alpha | 1011110 | 1010110 |
| Urgent Voice Message | Num | 1010 | 0011 |
| | Alpha | 1011110 | 1000010 |
| Graphic/Data File Message | Alpha | 1011110 | 1000111 |

-continued

| COMMANDS | Character A (MSC) | Character B (LSC) |
|---|---|---|
| Graphic/Data File Message with ASCII | Alpha   1011110 | 1000110 |
| Canned Message Retrieval | Num   1110 | Canned Message Identity Two 4-bit digits |
|  | Alpha   0100011 | Canned Message Identity Two 7-bit digits |

By way of clarification an Urgent Message is a command in any message to indicate to the pager user the urgent nature of the message. Voice Message is a command used to indicate to the pager user that a voice message is available in the network. Urgent Voice Message is a command which is used to indicate to the pager user that an urgent voice message is available in the network. Graphic/Data File Message is a command which is used to indicate free-format binary data. This binary data can include ASCII characters if desired by using a control field as for word compression in which the locations in a Data Field are identified where word identities, that is dictionary references, and ASCII character strings are formatted. One application of such a binary data file is the pixel field of graphic diagrams. Finally, Canned Message Retrieval relates to canned messages that have been defined and programmed in the pager and are retrievable by a short 3-character message. This Extended Address Field message can be either three numeric (Hex) characters or three alpha-numeric (ASCII) characters. The function code bit/bits in the address code word directs the pager to the format to decode.

With respect to facilities available to an operator via any RIC these facilities require the Extended Address Field (EAF) to begin with a specified command character and be followed by a number of characters as defined in the following table.

| COMMANDS | Character A (M.S.C) | Character B (L.S.C) |
|---|---|---|
| Sign-on Message | 1011110 | 1010011 |

Sign-on Message is a command identity which is used to indicate to the pager the message the operator would like the pager user to read following switch on of the pager. This message will be stored in a sign-on memory in the pager.

The following facilities are available by way of the Base RIC, where "Base RIC" is a RIC which is programmed into the pager in the factory or at point of sale and cannot be changed by over air programming.

Fundamental re-structuring or re-programming of the pager can be accomplished over the air but only through the use of the control function code of a defined Base RIC where a zero indicates an alpha (or numeric) function and "1" indicates the function of control (program). A control code or re-programming message is formatted as illustrated in FIG. 3b in which case no control field is transmitted. All re-programming messages must be received error free.

The Extended Address Field begins with a specified 4-bit command character and is followed by a 4-bit character defining which of the RICs programmed in the pager is to be modified.

The 4-bit commands are defined in the following table:

| Command Function | Command | RIC ID | Data Field |
|---|---|---|---|
| Enable RIC | 0000 | 4 bits | No Field |
| Disable RIC | 0001 | 4 bits | No Field |
| Set Personal RIC | 0010 | 4 bits | RIC data, as 1.2.4 |
| Set Subscription RIC | 0011 | 4 bits | RIC data, as 1.2.4 |
| Set Subscription Service Identifier | 0100 | 4 bits | 7 bits, SSI |
| Set Batch Zero Marker | 0101 | 4 bits | RIC data, as 1.2.4 |
| Enable Subscription Service | 0110 | 4 bits | 7 bits, SSI |
| Disable Subscription Service | 1001 | 4 bits | 7 bits, SSI |
| Set Extended Address User Group Numeric | 1010 | 4 bits | Two × 4 bits |
| Set Extended Address User Group Alpha | 1011 | 4 bits | Two × 7 bits |
| Disable Extended Address User Group | 1100 | 4 bits | No Field |
| Enable Extended Address User Group | 1101 | 4 bits | No Field |
| Set Channel | 1110 | 1111 | 2 × 7- or 4-bit characters |
| Enable New Channel | 1111 | 1111 | 2 × 7- or 4-bit characters |
| Enable Channel Scanning | 0111 | 1111 | No Field |
| Disable Channel Scanning | 1000 | 1111 | No Field |

Referring to the above table, channel scanning is achieved with the aid of two features which are the Batch Zero Marker and the Channel Programming Command. The Batch Zero Marker is a standard address code word conforming to the code word structure of the other code words in the batch. It is transmitted only in the first code word position in the first frame of a cycle. This code word is used for cycle synchronisation. The Batch Zero Marker can be programmed to be network dependent and thus an operator identifier. Each pager can be programmed with more than one Batch Zero Marker. A pager can be programmed to start scanning through its set of channels when it has failed to identify a synchronisation code word and a Batch Zero Marker. The loss of synchronisation period before scanning will depend on the maximum allowable transmitter-off period which in most systems is not likely to exceed one minute. The sampling period of each program channel by the pager is again dependent on the maximum allowable transmitter-off period. Time to regain synchronisation on a new channel will thus depend on the network transmitter-off strategy.

From the above table it can be seen that the pager can be given 99 new channels on which to operate. These channels can be set one at a time by a programming command plus two decimal digits comprising four or seven bits each. "Set channel" to 00 will clear all set channels and return the pager to the factory programmed base channel. "Enable New Channel" will cause the pager to operate on the specified channel and "Enable Channel Scanning" will cause the pager to operate on any of the set channels according to the detected Batch Zero Marker. Finally, "Disable Channel Scanning" will cause the pager to operate on the factory programmed base channel.

Reconfiguring facilities are available to the user and as such do not require access to the base RIC control function code. These reconfiguring facilities require the Extended Address Field to begin with a specified command character. The Extended Address Fields for these reconfiguring facilities are defined the following table.

| Command Function | Extended Address Field Command | Data Field |
|---|---|---|
| Define Canned Message | 1000000 @ | 2 × 7 bit digits ASCII 7-bit Data |
| Set International Character Set | 0101010 * | 1 × 7-bit digit No Field or alpha message. |
| Set Dynamic Group RIC | 1011110 1000100 | RIC data, as 1.2.4. |

Referring to the table, "Define Canned Message" relates to a user sending a message beginning with ASCII "@", the data field will be stored in the pager as a canned message that can be retrieved by a canned message retrieval message defined previously. The two 7-bit character definition identifies the canned message for retrieval. "Set International Character Set" refers to the fact that a pager may contain up to 10 variations or modifications of the ASCII character set. The "Set International Character Set" message will switch the pager into the defined character set; it can be switched back to a new character set with an appropriate message. Note that the command codes are normally transmittable characters commencing with "*". A specimen set of international variant characters is shown in the following table in which the abbreviation "TBA" means "To Be Advised".

| Command | Character Set | ISO No |
|---|---|---|
| *0 | ANSI | 6 |
| *1 | English | 4 |
| *2 | Spanish | 17 |
| *3 | French | 69 |
| *4 | German | 21 |
| *5 | Swedish | 10 |
| *6 | Portuguese | 16 |
| *7 | Italian | 15 |
| *8 | TBA | |
| *9 | TBA | |

Lastly "Set Dynamic Group RIC" enables a temporary RIC to be assigned to a group of pagers before a common long alpha-numeric message is sent. Each pager is sent individually short "Set Dynamic Group RIC" message before the common long alpha-numeric message is transmitted. This common message is transmitted with the assigned dynamic group RIC. Each pager will retain the assigned dynamic group RIC for four minutes. Any common message must be transmitted within four minutes of the first "Set Dynamic Group RIC" message being transmitted.

Figure 4:
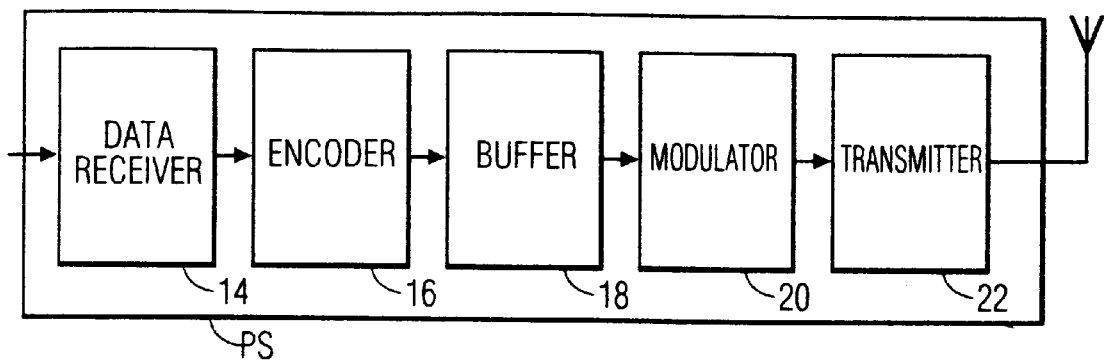
FIG. 4 is a block schematic diagram of a primary station.

FIG. 4 is a block schematic diagram of a primary station PS which in this instance includes means 14 for receiving data to be sent from either an operator control keyboard (not shown) or a personal computer (not shown). The data from the receiving means 14 is relayed to a stage 16 in which it is encoded, formatted and indicia such as an Extended Address Field is concatenated with the address code word. The concatenated address, EAF, and message code words together with sync code words and Batch Zero Marker are assembled into a batch in a buffer storage stage 18. At the appropriate time batches of code words are read out of the stage 18 and are modulated on to a carrier wave in a modulator 20 and are transmitted by a base station transmitter 22.

Figure 5:
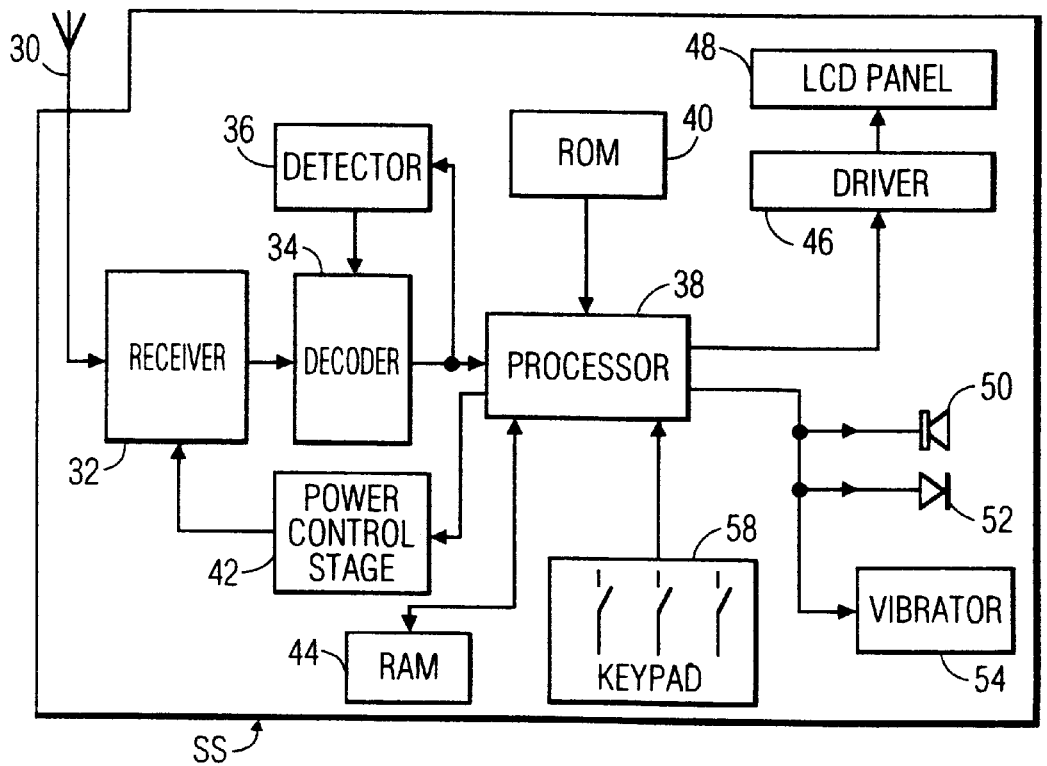
FIG. 5 is a block schematic diagram of a secondary station.

The secondary station SS shown in FIG. 5 comprises an antenna 30 connected to a receiver 32 which has an output connected to a decoder 34. An address code word detector 36 is connected to the decoder 34. A processor 38 which is operated in accordance with a program stored in a ROM 40 is coupled to the output of the decoder 34. The processor 38 provides several outputs which include:

(1) a receiver on/off signal coupled to a power control stage 42 which controls the energisation of the receiver 32, (2) a message output/input coupled to a RAM 44 for storing messages, (3) an output coupled to driver circuitry 46 for displaying on an LCD panel 48 messages read out of the RAM 44, and (4) enunciating signal output which is supplied to one or more of an acoustic transducer 50, light emitting device 52, for example a LED, and a vibrator 54. A keypad 58 has an output coupled to the processor 38.

The processor 38 is able to detect the EAF or other indicia and to adapt itself in accordance with the commands carried by the EAF.

Although the present invention has been described with reference to a paging protocol which has evolved from POCSAG, it is to be understood that the present invention could be applied to other digital signalling protocols.

From reading the present disclosure, other modifications will be apparent to persons skilled in the art. Such modifications may involve other features which are already known in the design, manufacture and use of communications systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

INDUSTRIAL APPLICABILITY

Digital paging and other communication systems used for transmitting data messages.

What is claimed is:

1. A communication system comprising a primary station and at least one secondary station, the secondary station having support for a facility optionally provided by the system, which support is selectively enabled at the secondary station, the primary station having means for formatting and encoding message data into message code words, means for concatenating an address code word of an addressed secondary station to the message code words, means for providing indicia indicative of the facility in a field contained in at least one of the message code words concatenated with the address code word and transmitting means for transmitting the concatenated address code word, indicia and message code words, and the at least one secondary station having means for determining if the address code word in a message received by said receiving means is one assigned to the secondary station, means responsive to determining that the address code word is one assigned to the secondary station for decoding said indicia and message code words, means for enabling presently disabled support for the facility at the secondary station in response to the received indicia and means for storing the decoded message data.

2. A primary station for use in a communication system as claimed in claim 1, comprising means for formatting and encoding message data into message code words, means for appending an address code word of a secondary station to the formatted message, means for providing indicia indicative of said optional facility being in a field contained in a message code word concatenated with the address code word and transmitting means for transmitting the concatenated address code word, indicia and message code words.

3. A secondary station for use in a communication system as claimed in claim 1, comprising: means for receiving transmissions, means for determining if the address code word in a message received by said receiving means is one assigned to the secondary station, means responsive to determining that the address code word is one assigned to the secondary station for decoding said indicia and message code words, means for enabling the normally disabled support for the facility at the secondary station in response to the received indicia and means for storing the decoded message data.

4. A secondary station as claimed in claim 3, including means for storing at least one subscription free identifier.

5. A method of transmitting messages in a communication system comprising a primary station and at least one secondary station, the secondary station being identifiable by an address code word and having support for a facility optionally provided by the primary station, which support is selectively enabled at the secondary station, the primary station transmitting message signals in the format of the address code word of an addressed secondary station concatenated with a plurality of message code words, wherein the primary station enables presently disabled support for the facility at the secondary station by transmitting indicia representative of the facility in a field contained in at least one of the message code words concatenated with the secondary station's address code word.

6. The method as claimed in claim 5, wherein the facility is associated with a receiver identity code of the secondary station.

7. The method as claimed in claim 6, wherein the the facility comprises call sequence numbering and the sequence order is specified in said indicia.

8. The method as claimed in claim 6, wherein the facility comprises subscription services and that a subscription service identifier is transmitted as the indicia.

9. The method as claimed in claim 8, wherein call sequence numbering is enabled on said subscription service and that a call sequence follows said subscription service identifier in said field.

10. The method as claimed in claim 6, wherein the facility comprises flexible grouping of secondary stations and in that said field comprises an extended address field containing characters indicating that flexible grouping is being enabled.

11. The method as claimed in claim 6, wherein the primary station reprograms a secondary station by transmitting a base receiver identity code as the address code word followed by an extended address field comprising a command character and a character defining which of the receiver identity codes pre-programmed into the secondary station is to be modified.

12. The method as claimed in claim 5, wherein said indicia comprises a command character and at least one character indicative of the optional facility.

13. A method of transmitting messages in a communication system comprising a primary station and at least one secondary station, the secondary station being identifiable by an address code word and being selectively enabled to interpret message signals from the primary station in a format defined by a facility optionally provided by the system, the message signals transmitted by the primary station being in the format of the address code word of an addressed secondary station concatenated with a plurality of message code words, wherein the primary station signals the secondary station that message signals from the primary station have been formatted in accordance with the optionally provided facility by transmitting indicia representative of the facility in a field contained in at least one of the message code words concatenated with the secondary station's address code word, and in response to the signaling by the primary station, the secondary station enables presently disabled support to interpret the message signals formatted in accordance with the optionally provided facility.

* * * * *